Sept. 2, 1958 G. W. BRYANS 2,850,072
ATTACHMENT FOR LAMINATING MACHINES
Filed April 8, 1955
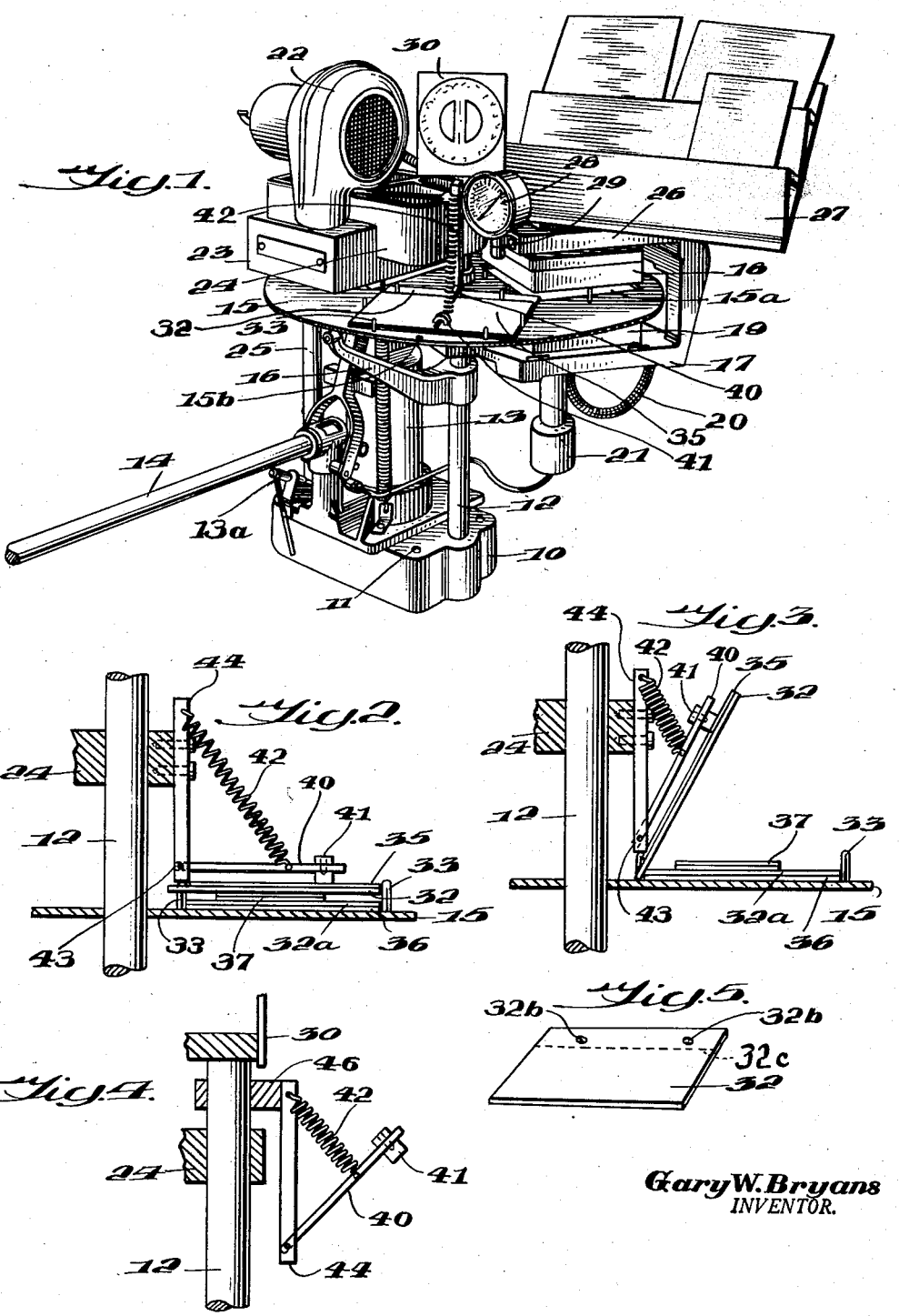
Gary W. Bryans
INVENTOR.

United States Patent Office 2,850,072
Patented Sept. 2, 1958

---

2,850,072

ATTACHMENT FOR LAMINATING MACHINES

Gary W. Bryans, Rochester, N. Y., assignor to Harco Industries, Inc., Rochester, N. Y., a corporation of New York Application April 8, 1955, Serial No. 500,150

4 Claims. (Cl. 154—1)

---

This invention relates to laminating apparatus, and more particularly to a device for facilitating loading and unloading of laminating apparatus of the type in which the work is sandwiched between a pair of planishing plates during the laminating operation.

The present invention is particularly useful with laminating machines of the type manufactured by Harco Industries, Rochester, New York, these machines being described in detail in U. S. Army publication FM-30(1) entitled "Instruction Book for Photographic Laminating Press," Order No. AF 32(600)-25341, December 18, 1953, to be replaced by TM11-2317 (listed in SR310-20-4). The invention is of general utility, however, with other types of laminating machines wherein the work is placed in a sandwich between planishing plates at a loading and unloading station and is then moved on a carrier to one or more treating stations which may include a heating station and a cooling station. Upon return to the unloading station, the sandwich is opened, the finished work removed, and new work inserted in the sandwich.

The work consists of two or more sheets of material to be laminated together, usually by heat, for example, two sheets of a vinyl material between which is inserted a sheet which is to be protected, for example, a photograph, pass, identification card or the like. Upon heating, usually under pressure, the outer sheets are softened and in some cases polymerized to form a transparent protective coating entirely surrounding the inner sheet.

The sheets comprising the work are assembled by hand and, until the present invention, it has been necessary to remove the upper planishing sheet entirely or hold it up with one hand while the finished work is removed and new work inserted with the other hand. This slows down the operations due to the inconvenience caused by unloading and loading with one hand. During loading, the sheets comprising the work must often be slid in various directions to align them properly, and this is sometimes inconvenient when using only one hand. If the upper planishing sheet is removed entirely and set aside during the loading and unloading operation, additional time is required for replacing it.

According to the present invention, I have provided an arrangement which moves the upper planishing plate in what might be called a "clam shell" opening movement; to an elevated position clear of the lower plate and retains it in this position during loading and unloading operations, and which permits ready return of the upper plate to its sandwiching position in close proximity to the lower plate, but without any relative sliding motion between the two plates during the final portion of the closing movement of the upper plate. By avoiding such sliding movement, one important source of disturbance of accurate alignment of the matter being laminated is eliminated. This arrangement greatly speeds up the loading and unloading operation in that it eliminates the necessity for holding the upper plate manually in elevated position or removing it entirely from the apparatus. The arrangement, in a preferred embodiment, comprises a support mounted on a fixed part of the machine and pivotally supporting an arm which carries a magnet. A spring or other biasing means urges the arm and magnet to an elevated position.

The magnet and arm are positioned so that when the arm is manually moved to its depressed or lowered position, the magnet engages the upper planishing plate (which is of magnetic material) located at the loading and unloading station. After the magnet engages the upper plate, release of manual pressure permits the spring to raise the arm, magnet and plate to an elevated position where they remain, the upper plate thus being out of the way during loading and unloading. With both hands free, the operator is able to increase the speed of operation to a considerable extent, as by using both hands in loading as well as unloading or by using one hand to remove the finished work while the other hand grasps the new work and places it on the lower planishing plate at the loading and unloading station. Then all that is required is to move the upper plate manually downwardly to its sandwiching position and disengage the magnet from it by a flick of the finger. The loaded sandwich is then ready to be moved to the next position of the laminating operation by movement of the carrier.

It is an object of the invention to provide an arrangement for facilitating operations at the loading and unloading station of a laminating machine. Another object is to provide a device at the loading and unloading station of a laminating machine, for moving the upper planishing plate of a laminating sandwich to an elevated position and for holding the plate in this position during loading and unloading operations, the plate being readily returnable to its sandwiching position and disengageable from the device. A further object of the invention is to provide a device as referred to above, which is readily mounted on existing laminating machines.

These and other objects of the invention will be apparent from the following description, considered with the accompanying drawing, in which:

Fig. 1 is a perspective view of a laminating machine with a preferred embodiment of the invention in place, the arm and magnet being in a lowered position;

Fig. 2 is a detail sectional view, partly in elevation showing the device in side elevation, and with the arm, magnet and upper plate in lowered position;

Fig. 3 is a view similar to Fig. 2, but with the arm, magnet and upper plate in elevated position;

Fig. 4 is a view similar to Figs. 2 and 3 and showing an alternative manner of mounting the support on the laminating machine; and Fig. 5 is a perspective view of one form of the upper planishing plate.

Referring now to Fig. 1 of the drawing, there is shown a laminating apparatus comprising a mounting base 10 provided with holes 11 for securing to a table or the like. Mounted in the base 10 is a post 12 and a hydraulic jack 13 operated by a pump handle 14. Rotatably mounted on post 12 is a guide plate or carrier 15 which is partly supported at its outer periphery by a roller-carrying arm 16 mounted on post 12. Post 12, by means of a mounting bracket 17, supports a lower heating platen 19 which cooperates with an upper heating platen 18 (supported in a manner described below). Platens 18 and 19 contain electrical heating coils (not shown) which are supplied with electricity by means including wire 20. The lower heating platen is movable upwardly by means of a hydraulic cylinder 21 connected to jack 13.

The heating platens form one treating station at which heat and pressure are applied to the material to be laminated, and located 120° around post 12 from the heating station is another treating station at which cooling of the work is accomplished by an electrically driven blower 22 arranged to blow air over an upper cooling platen 23 having fins (not shown) on its upper surface. An upper crown casting 24 mounted on post 12 by a set screw or the like (not shown), and another post 25 mounted in base 10, support the blower arrangement, including upper cooling platen 23. A portion 26 of casting 24 carries upper heating platen 18 which is fixed thereto, and also supports a stock rack 27 and a pressure gauge 28 for the hydraulic system. A U bracket 29 supports gauge 28 on the casting 26. A timer 30 is attached to the upper end of post 12.

Guide plate or carrier 15 has three rectangular openings 15a positioned on centers 120° apart. Only one opening 15a is clearly visible in Fig. 1, this being the one located at the heating station. One opening is located at the cooling station and is barely visible, while the third one is located at the loading and unloading station and is nearest the viewer, this opening 15a being covered by a pair or sandwich of planishing plates, the upper of which is seen at 32 and the lower of which is seen at 32a in Figs. 2 and 3. Carrier 15 is provided with three small holes 15b located 120° apart and which cooperate with a locking rod (not shown) which holds the carrier in any one of three positions 120° apart, with the openings 15a correctly positioned.

Each opening 15a is surrounded by a plurality of upwardly extending positioning or locating pins 33. These pins are spaced from the edges of openings 15a, and in the embodiment shown, there are two pins 33 along each of the two longer edges of the openings 15a and one pin at each end of the openings, the number of pins not being critical so long as they serve their intended function of defining the position of each sandwich of planishing plates 32 and 32a located at each opening 15a.

The planishing plates are highly polished sheets, preferably of metal, and according to a preferred embodiment of the present invention, the upper plate 32 is of magnetic material. These plates are rectangular and slightly larger than the openings 15a, being dimensioned so as to be held by pins 33 against substantial horizontal movement relative to carrier 15. In accordance with the present invention, upper plate 32, which previously did not extend beyond the area defined by pins 33, is enlarged in its shorter dimension and provided with a pair of holes 32b as shown in Fig. 5, for a purpose to be explained presently.

Openings 15a in carrier 15 are slightly larger than lower heating platen 19 and the corresponding lower platen (not shown) at the cooling station, which is located directly over jack 13. Thus these lower platens, when moved upwardly by jack 13 and cylinder 21 which is operated by the jack, pass through openings 15a, and in their upward movement, pick up the sandwich of planishing plates and work carried by the guide plate or carrier 15 at the position of each opening 15a. These sandwiches are thus moved upwardly and pressed against the upper platens 18 and 23, respectively, at the heating and cooling stations.

Upon release of jack pressure by operation of a pressure release mechanism 13a and consequent lowering of the lower heating and cooling platens, the lamination sandwiches at the heating and cooling stations are returned to their lower positions resting on carrier 15 above one of the openings 15a, the positions being defined by pins 33.

It is convenient to use, in addition to the upper and lower planishing plates of each sandwich, outer cushioning pads above the upper plate and below the lower plate. These may be merely sheets of heavy paper such as blotting paper, and are shown at 35 and 36 in Figs. 2 and 3. Work is shown at 37 in Figs. 2 and 3, only the two sheets to be laminated being shown.

In operating a laminating press as described above, it has been the practice at the loading and unloading station for the operator to remove the upper plate 32 and cushion 35 from carrier 15 and place them on the table (not shown) or in the stock rack 27, so as to have both hands free for placing the new work on lower planishing plate 32a. Since the work must be correctly aligned, the use of both hands facilitates the loading operation. After loading, the upper plate 32 and cushion 35 are placed on top of the new work and the carrier rotated to bring this work to the heating station and at the same time bringing finished work from the cooling station to the loading and unloading station.

To remove the finished work, the upper planishing platen used in laminating this work has been removed in order to remove the finished work and insert new work to be laminated, both hands of the operator being needed for these operations.

The present invention resides in an arrangement which renders it unnecessary to remove the upper plate 32 and cushion 35 every time the loading and/or unloading operation is carried out. While the apparatus may take various forms within the scope of the invention, this apparatus holds the upper plate 32 and cushion 35 in an elevated position, leaving both hands of the operator free for the loading and unloading operations. It also permits ready return of the plate 32 and cushion 35 to their sandwiching or laminating positions by a quick operation. In a preferred embodiment, the apparatus according to the invention actually moves the upper plate and cushion to the elevated position once it is moved into engagement with the upper plate and cushion and is released.

According to a preferred embodiment of the invention, I have provided on a laminating machine as described above, a pivotally mounted arm 40 carrying near its free end retaining means comprising a permanent magnet 41, the arm being urged to an elevated position by a spring 42 constituting biasing means for the arm. When arm 40 is in its lower or depressed position as shown in Fig. 2, the magnet attaches itself to upper planishing plate 32, even though cushion 35 separates the two. Upon upward movement of arm 40 under the pull of spring 42, upper plate 32 and cushion 35 are moved upwardly to an elevated position spaced above lower plate 32a, thus exposing the upper surface of plate 32a to the operator for loading and/or unloading operations, leaving both hands of the operator free.

In the embodiment shown in Figs. 1–3, the arm 40 is pivotally attached at 43 to the lower end of an upright support 44 which is attached to a fixed part of the apparatus, which in this embodiment is the hub portion of upper crown casting 24. As shown, spring 42 is attached to the upper end of support 44.

The lower end of support 44 lies only a short distance above the level of the upper ends of aligning pins 33 nearest post 12. Thus the lower end of support 44 engages the upper surface of cushion 35 and plate 32 as they swing upwardly, and thus maintains holes 32b in the plate in engagement with these pins 33. This assures that when the operator has completed the loading operation and manually returns arm 40 to its lower position (Fig. 2), plate 32 will return to its correct position. After doing this, the operator readily disengages the magnet from its attachment to plate 32 by holding the plate down and moving arm 40 upwardly to achieve separation of the magnet and plate 32. When this is done, arm 40 and the magnet are moved by the spring to their elevated position until the next sandwich of finished work is moved to the loading and unloading station from the cooling station, simultaneously with movement of the new work to the heating station by rotation of carrier 15. Arm 40 is then manually moved downwardly to attach magnet 41 to the upper plate 32 of the newly completed work as shown in Fig. 2, and is then released for movement of the plate 32 upwardly under the pull of magnet 42 to the position of Fig. 3.

The mounting of support 44 is not critical except that it should be to a fixed part, and it should preferably be readily mounted on existing laminating machines without return to the factory. Alternative means of mounting are shown in Fig. 4, wherein support 44 is attached to a mounting 46 which is held in a fixed position on post 12 by a set screw or the like (not shown). Mounting 46 is shown in a position above upper crown casting 24 and below timer 30, and is readily added to existing machines merely by removal of timer 30 to slide mounting 46 into place.

In another embodiment (not illustrated), support 44 may be mounted on portion 26 of casting 24 by means of the screws which hold U bracket 29 is place.

The arrangement of pins 33 and holes 32b provides interengaging means for positioning plate 32 with respect to carrier 15. Alternatively, the pins could be carried by plate 32, projecting downwardly therefrom to engage cooperating holes (not shown) in plate 15. In such case the holes in plate 15 could be in the form of elongated slots parallel with the shorter dimension of plate 32, so as to permit swinging movement of the pins toward the viewer in Fig. 1 as plate 32 is raised to its elevated position, this movement being accompanied by a slight raising of the near edge of lower plate 36 as the pins swing under it. Alternatively, the holes in carrier 15 could be round, the pins being formed as downward projections from a rear marginal portion of plate 32. This marginal portion is indicated by the numeral 32c in Fig. 5, and would be hinged to the main body of plate 32 along a line shown by the broken line in Fig. 5, the hinge being made so as not to extend beyond the upper or lower surfaces of the plate.

While the invention has been described and illustrated as applied to a manually operated machine, this has been done primarily for purposes of clarity of description. The value of the invention is considerably enhanced when applied to power operated and/or automatically operating machines, in which case the retaining device for the upper plate could be operated entirely automatically by electromagnet, cam or other means readily apparent to one skilled in the art. The rotary movement of carrier 15 is merely an example of the type of arrangement which can be used, as it will be apparent that a carrier moving in other than a circular path can be used. For example, the carrier could comprise a reciprocating plate, and endless belt or other suitable conveyor means, with the various stations located in any convenient locations.

It will be understood that I have described only a preferred embodiment and a few variations within my inventive concept. In addition to the variations disclosed above, various others can be used in place of the pivoted arrangement (for example, a vertical sliding arrangement), the spring (for example, hydraulic means) and the magnet (for example, other retaining means such as a suction cup or a releasable device for positively gripping the upper plate 32). All of these variations as well as others which will be obvious to those skilled in the mechanical arts are within the scope of my inventive concept, which is to be considered as limited only in accordance with the appended claims.

I claim:

1. In laminating apparatus in which the work sandwiched between a pair of planishing plates is moved on a carrier through a plurality of stations including a loading and unloading station and a treating station, said carrier having a plurality of upwardly projecting pins for positioning each pair of plates on said carrier, a device for facilitating operations at said loading and unloading station by releasably retaining said upper plate in a raised position separated from said lower plate during loading and unloading, said device comprising an upright support mounted on a fixed part of the apparatus with its lower end in close proximity to a marginal portion of the upper plate of a pair of planishing plates located at said loading and unloading station, the said upper plate being of magnetic material and having at least one opening along said marginal portion of the plate for engagement with one of said pins, an arm pivotally attached to the lower end of said support, a magnet carried by said arm and magnetically attachable to the upper plate of the pair of said planishing plates located at said loading and unloading station, and a spring attached to said support and to said arm and arranged to urge said arm and magnet to an elevated position in which a plate held by said magnet is retained in an elevated position spaced from the lower plate, in which position of the upper plate said marginal portion of said upper plate is in engagement with the lower end of said support and is thereby held in engagement with said pin to assure correct positioning of the plate upon return to its lowered position.

2. In laminating apparatus of the type in which the work, sandwiched between a pair of planishing plates, is moved on a carrier through a plurality of stations including a loading and unloading station and a treating station, an arrangement for facilitating operations at said loading and unloading station, comprising a support located at the loading and unloading station, magnetic means pivotally mounted on said support and releasably attachable to the upper plate of a pair of planishing plates located at the loading and unloading station, said upper plate being of magnetic material said magnetic means being positioned to hold said upper plate in an elevated loading position with one edge portion of the upper plate closely adjacent to the corresponding edge portion of the lower plate of the pair and with the opposite edge of the upper plate raised a substantial distance above the lower plate, and hinge means including at least one pin extending transversely to the plane of said lower plate in engagement with said adjacent edge portions of both plates of the pair and providing a hinged relation of said one edge portion of the upper plate and the corresponding edge portion of the lower plate of the pair.

3. In laminating apparatus in which the work, sandwiched between a pair of planishing plates is moved on a carrier through a plurality of stations including a loading and unloading station and a treating station, said carrier having a plurality of pins projecting in a direction transverse to the plane of said plates for positioning each pair of plates on said carrier, a device for facilitating operations at said loading and unloading station by releasably retaining said upper plate in a raised position separated from said lower plate during loading and unloading, said device comprising a magnet mounted for engagement with the upper plate of a pair of planishing plates located at said loading and unloading station, said upper plate being of magnetic material, hinge means providing pivoting relation between one edge of said upper plate and the corresponding edge of the lower plate of the pair when said pair is located at said loading and unloading station, and biasing means urging said magnet to a position at which said magnet, when in engagement with said upper plate, releasably retains said upper plate in a position rotated through an arc about said hinge means from parallelism with the plane of the lower plate of the pair and wherein the edge of the upper plate opposite its hinged edge is spaced a substantial distance from the corresponding edge of said lower plate so as to provide ready access to the space between said plates for convenience of loading and unloading.

4. In laminating apparatus in which the work, sandwiched between a pair of planishing plates in moved on a carrier through a plurality of stations including a loading and unloading station and a treating station, said carrier having a plurality of upwardly projecting pins for positioning each pair of plates on said carrier, a device for facilitating operations at said loading and unloading station by releasably retaining said upper plate in a raised position separated from said lower plate during loading and unloading, said device comprising an upright support mounted on a fixed part of the apparatus with its lower end in close proximity to a marginal portion of the upper plate of a pair of planishing plates located at said loading and unloading station, the said upper plate having at least one opening along said marginal portion of the plate for engagement with one of said pins, an arm pivotally attached to the lower end of said support, retaining means carried by said arm and releasably attachable to the upper plate of the pair of said planishing plates located at said loading and unloading station, and a spring attached to said support and to said arm and arranged to urge said arm and retainnig means to an elevated position in which a plate held by said retaining means is retained in an elevated position spaced from the lower plate, in which position of the upper plate said marginal portion of said upper plate is in engagement with the lower end of said support and is thereby held in engagement with said pin to assure correct positioning of the plate upon return to its lowered position.

References Cited in the file of this patent

UNITED STATES PATENTS

| | | |
|---|---|---|
| 224,239 | Stearns | Feb. 3, 1880 |
| 496,399 | Damm | May 2, 1893 |
| 527,689 | Hernsheim | Oct. 16, 1894 |
| 1,525,629 | Thompson | Feb. 10, 1925 |
| 1,614,601 | Davis | Jan. 18, 1927 |
| 1,751,869 | Mayne | Mar. 25, 1930 |
| 2,045,705 | Finn | June 30, 1936 |
| 2,431,048 | Kilborn | Nov. 18, 1947 |
| 2,620,014 | Lyijynen | Dec. 2, 1952 |
| 2,718,030 | Collins et al. | Sept. 20, 1955 |